(12) United States Patent
Bakhoum (10) Patent No.: US 9,044,025 B2
(45) Date of Patent: Jun. 2, 2015

(54) APPARATUS AND METHOD FOR SIMULTANEOUS CUTTING, IMPRINTING AND PIERCING OF DOUGH

(71) Applicant: Michel T Bakhoum, Mundelein, IL (US)

(72) Inventor: Michel T Bakhoum, Mundelein, IL (US)

(*) Notice: Subject to any disclaimer, the term of this patent is extended or adjusted under 35 U.S.C. 154(b) by 0 days.

(21) Appl. No.: 13/917,442

(22) Filed: Jun. 13, 2013

(65) Prior Publication Data

US 2014/0370175 A1    Dec. 18, 2014

(51) Int. Cl.
*A21C 5/02* (2006.01)
*A21C 5/00* (2006.01)

(52) U.S. Cl.
CPC .................................. *A21C 5/003* (2013.01)

(58) Field of Classification Search
CPC ........ A21C 11/02; A21C 11/04; A21C 11/08; A21C 11/10; A21C 11/103; A21C 11/106; A21C 11/12; A21C 11/14; A21C 11/24; A21C 5/00; A21C 5/08; A21C 7/04; A21C 7/06; A21C 3/10; A21C 14/003; A21C 5/003
USPC ......... 425/202, 235, 279, 281, 292, 294, 298, 425/299, 307, 308, 310, 315, 316, 221, 278, 425/362, 396, 363, 369, 370, 373, 374, 384, 425/385, 401, 405.1
See application file for complete search history.

(56) References Cited

U.S. PATENT DOCUMENTS

| 177,319 A | 5/1876 | Blaul | |
|---|---|---|---|
| 1,728,702 A * | 9/1929 | Smith | 425/292 |
| 2,144,720 A * | 1/1939 | Gibson | 426/302 |
| 2,525,987 A * | 10/1950 | Williamson | 83/117 |
| 3,603,270 A * | 9/1971 | Tangel | 99/450.6 |
| 3,880,030 A * | 4/1975 | Rosengren | 83/863 |
| 4,276,800 A | 7/1981 | Koppa et al. | |
| 4,578,027 A * | 3/1986 | Koppa et al. | 425/298 |
| 4,881,889 A * | 11/1989 | Spiel et al. | 425/383 |
| 5,162,119 A | 11/1992 | Pappas et al. | |
| 5,306,133 A * | 4/1994 | Dayley | 425/217 |
| 5,388,489 A | 2/1995 | Dayley | |
| 5,576,033 A * | 11/1996 | Herrera | 425/217 |
| 5,641,527 A * | 6/1997 | Burger | 426/94 |
| 5,871,783 A * | 2/1999 | Capodieci | 425/174.2 |
| 7,845,928 B2 | 12/2010 | Finkowski et al. | |
| 7,914,834 B2 * | 3/2011 | Fu et al. | 426/503 |
| 2006/0286244 A1 * | 12/2006 | Fu et al. | 426/549 |
| 2010/0159095 A1 * | 6/2010 | Suski et al. | 426/383 |
| 2010/0173052 A1 * | 7/2010 | Suski et al. | 426/389 |
| 2010/0227024 A1 * | 9/2010 | Flores | 426/87 |
| 2012/0251690 A1 | 10/2012 | Flores | |
| 2012/0263851 A1 * | 10/2012 | Flores | 426/549 |

* cited by examiner

*Primary Examiner* — Seyed Masoud Malekzadeh
(74) *Attorney, Agent, or Firm* — Takiguchi & Vogt, LLP (57) ABSTRACT

An apparatus configured for concurrently cutting, imprinting and piercing of a sheet of dough consisting of flour, water and yeast to produce imprinted loaves is disclosed. Arrays of molded frames each containing edged borders and an emboss pattern are placed onto the surface of a cylinder member configured for rotating onto a sheet of dough to simultaneously cut out loaves, imprint the loaves with the emboss pattern and pierce the loaf with pins. The emboss pattern contains areas raised above the surface of the cylinder member and recessed areas below that surface. The emboss patterns include a plurality of Coptic religious symbols that are imprinted onto the loaves to form a Korban used for ceremonial purposes. The emboss pattern is heated and initiates a par-baking process when the cylinder member engages the dough. The formation of the Korban loaves is completed by baking the loaves in the oven.

15 Claims, 7 Drawing Sheets

APPARATUS AND METHOD FOR SIMULTANEOUS CUTTING, IMPRINTING AND PIERCING OF DOUGH

RELATED APPLICATIONS

This application claims priority from provisional application No. 61/668,528 filed on Jul. 6, 2012.

FIELD OF THE INVENTION

The present invention generally relates to an apparatus and a method for embossing and imprinting dough. More specifically, the present invention relates to an apparatus and a method of simultaneously cutting out sections from a flat sheet of dough, embossing the sections with Coptic insignia and forming loaves for ceremonial purposes.

BACKGROUND OF THE INVENTION

A Coptic Orthodox Christian congregation has a meal together after the holy mass as a sign of love and communion. In in the early days a complete meal was offered after the mass. At the present time, the Korban, a small round loaf of bread has been substituted for the meal. The Korban is stamped with the "Trisagin" (the triple invocation of God as holy) and with crosses and has the same wheat flour, water and yeast only. The bread is leavened and is baked unsalted. The central part of the Korban is called "Despatikon" meaning "Lordly" and around the Despatikon twelve crosses referring to the twelve disciples. The Despatikon also is pierced with five holes referring to the spear and nails which Christ suffered. The word "Agios" is written in three times on the periphery of the Despatikon which represents the "Holy Trinity".

Prior art references that relate to imprinting dough with relatively complex patterns engraved on a surface disposed on a rotary device include: U.S. Pat. Nos. 177,319, 4,276,800, 5,162,119, 5,388,489, 7,845,928, US 20100159095 and US20120251690. These devices are referred to in the art as rotary cutters which are configured to cut and imprint the dough.

Imprinting this pattern on dough and creating the finished Korban presents a number of challenges not addressed by the prior art. The pattern on the Korban loaf contains raised areas, such as the images of some of the crosses and the Coptic symbols and letters, alongside sunken areas; for example in some of the border outline areas and some of the cross images. The overall pattern must be configured in a way that the dough flows smoothly between the raised and sunken areas on the emboss pattern so that not to disrupt the imprinted images on the Korban. Furthermore, the dough must be pierced through to produce the five holes representing the spear and nails that pierced Christ. Simultaneously, the loaf needs to be cut out of a sheet of dough and areas provided for the air to escape so to prevent air from disrupting the dough from rising to the full loaf. Also, the type of dough that contains only flour water and yeast tends to be particularly unstable if left unbaked for long periods of time.

SUMMARY OF THE PRESENT INVENTION

In one aspect of the present invention, an apparatus configured for concurrently cutting, imprinting and piercing of a sheet of dough to produce imprinted loaves, the dough consisting of flour, water and yeast, the apparatus comprises: a cylindrical member mounted on an axle, the cylindrical member having a length; at least one emboss pattern engraved onto a surface disposed on the cylindrical member, the emboss pattern being placed inside a frame encircled by an outwardly extending border, the border constituting cutting edge lips protruding above the surface, the emboss pattern containing a plurality of shaped projections that protrude outwardly and are elevated above the surface on which the emboss pattern is placed, the emboss pattern also containing recessed areas below the surface on which the emboss pattern is placed; and a plurality of outwardly projecting pins contained within the emboss pattern, the pins being affixed on the surface, wherein downward pressure applied onto the cylindrical member is configured to cause the cylindrical member to engage a sheet of dough in a manner such that simultaneously the border lip slices out a loaf from the dough, the emboss pattern encircled by the border lips imprints the loaf and the pins contained within the emboss pattern pierce the loaf.

In another aspect of the present invention, a method for producing loaves each imprinted with a pattern containing a plurality of raised areas and a plurality of recessed areas the method comprises: providing an apparatus configured for concurrently cutting, imprinting and piercing of a sheet of dough to produce imprinted loaves, the dough consisting of flour, water and yeast; loading the cylinder member onto the sheet of dough in a manner as to simultaneously sever individual loaves from the sheet of dough, imprint each loaf with the emboss pattern and pierce the dough by the pins contained within the each emboss pattern; heating each loaf to a temperature between about 90 degrees F. to about 180 degrees F. through contact with a heated emboss pattern to initiate a process of rising and for stabilizing the dough; and baking the loaves in the oven to complete the baking process.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

The present invention relates to a rotary cylinder member configured for rotating and for concurrently cutting, imprinting and piercing a sheet of dough consisting of flour, water and yeast to produce imprinted loaves. To accomplish this, the rotary cylinder member contains at least one emboss pattern placed inside a frame disposed on the surface of the rotary cylinder member. In the preferred embodiment, the emboss pattern is engraved onto the surface of the cylinder member contained within the frame. In the preferred embodiment of the present invention, a circular shaped frame is molded onto the cylinder member, but other types of frames as well as various attachment means to the cylinder member also fall within the scope of the present invention. The frame comprises borders that encircle the emboss pattern. The borders have edges raised above the surface of the cylinder as well as above that of the emboss pattern and are configured to cut a sheet of dough when sufficient pressure is applied onto the cylinder. The pattern is configured to produce a plurality of images on the dough sheet that represent Coptic religious symbols including Coptic letters, crosses, circles and squares. These images are created by a combination of recessed areas and protrusions on the emboss pattern that are imprinted and transferred onto the Korban loaf surface. In another embodiment, the pattern may be engraved on plates placed inside their respective molded frames. The borders may form a round cup shape; however elliptical shapes with the major axis arranges longitudinally on the cylinder and the minor axis arranged axially also falls within the scope of the present invention.

In the preferred embodiment, the rotary cylinder is rotated while it is pressed onto a sheet of dough. The sheet may be moving on a conveyor or be stationary while the rotary cylinder member rotates and engages the dough. Vertical pressure is applied onto the rotary cylinder to a sufficient extent so that the borders of each frame cut through the dough to produce individual loaves and simultaneously the emboss pattern is imprinted on the dough surface. In the preferred embodiment of the present invention, the cylinder member including the molded frames and emboss patterns are heated to a range of temperatures between 90-180 degrees depending on speed of cylinder rotation and thickness of the dough sheet. The contact between the heated molded frames and emboss patterns with the dough initiates a process known as par-baking, i.e., the process of rising and for stabilizing the dough. It will be appreciated by those skilled in the art that heating the emboss pattern is best accomplished by placing electrical resistors inside the cylinder member heated by passing an electrical current through the resistors and providing heat transfer means to the surface of the cylinder member; however other heating means fall within the scope of the present invention as well.

The frames are arranged spacially in such a manner as to minimize the space between adjacent molded frames thereby maximizing the number of loaves that are produced in the process. A number of frame arrangements fall within the scope of the present invention.

Figure 2:
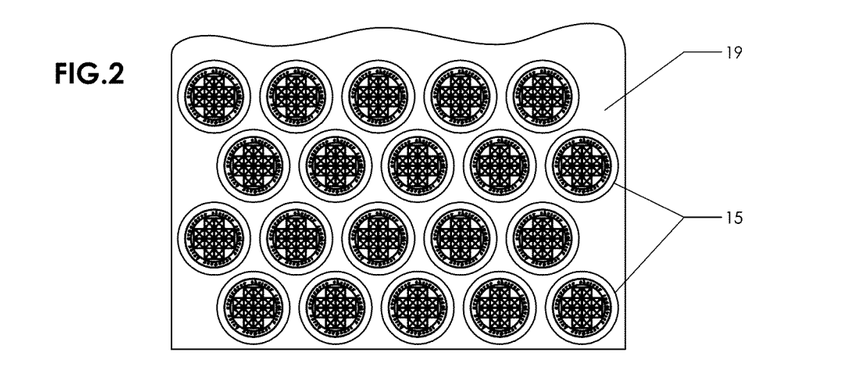
FIG. 2 shows rows of imprinted loaves on a sheet of dough with the image of the Korban using the device for cutting, imprinting and piercing dough.
Figure 3:
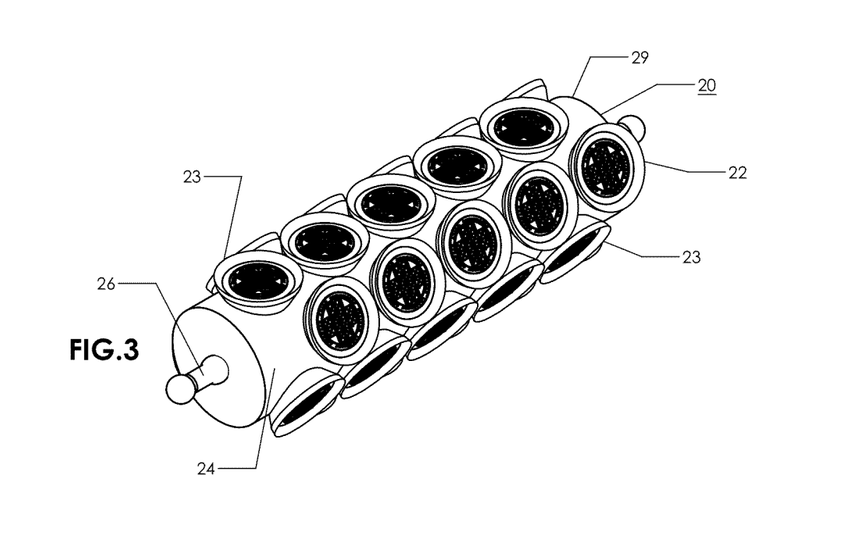
FIG. 3 is an isometric view of the rotary cylinder member containing the emboss patterns inside respective frames according to an embodiment of the present invention.
Figure 10:
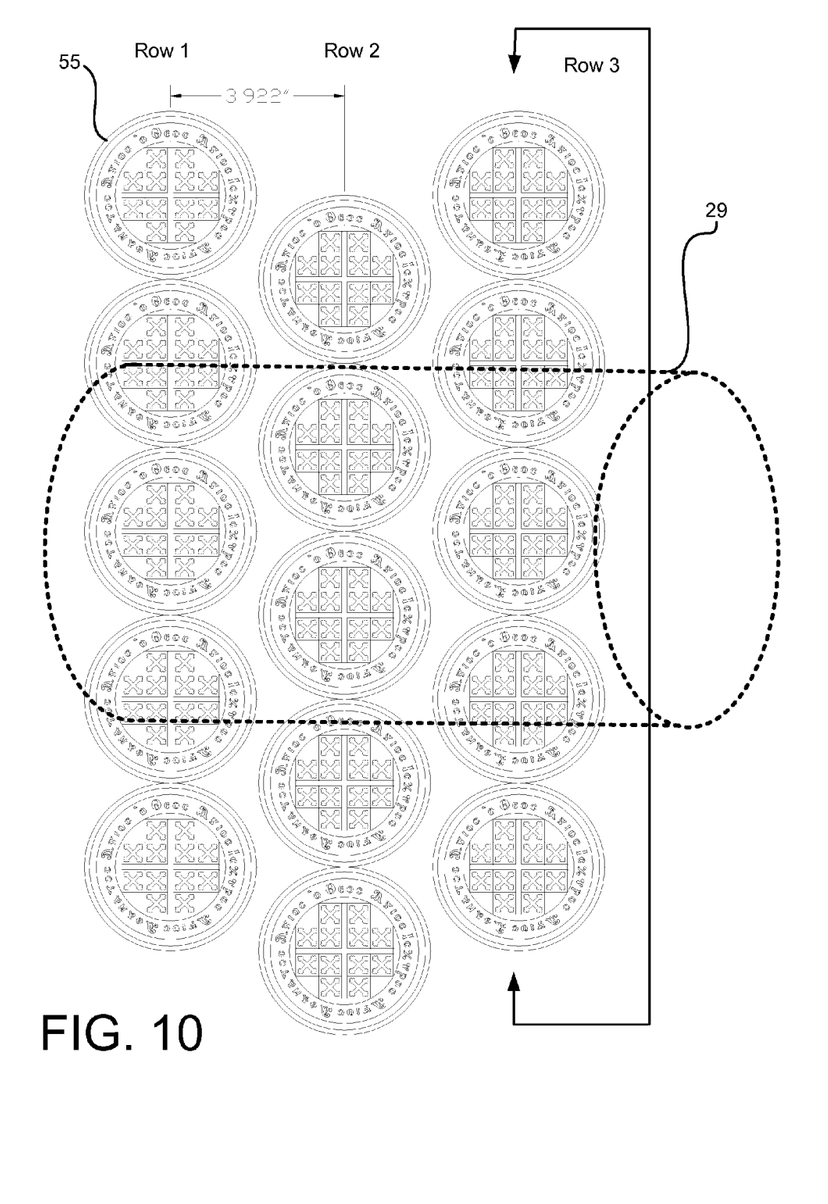
FIG. 10 is a view of the arrays of the emboss patterns engraved onto the cylinder member according to an embodiment of the present invention.

FIG. 10 shows arrays of molded frames containing the emboss patterns arranged in rows arranged axially wherein the border of each molded frame contacts that of an adjacent molded frame in that row. The molded frames of rows adjacent to the first row are placed in staggered positions relative to those in the first row. A cylinder member may have three rows of molded frames; however, fewer than three and more than three rows also fall within the scope of the present invention. Each row contains five emboss patterns each contained within its cup-shaped borders; however, fewer than five and more than five embossed patterns also fall within the scope of the present invention. In FIGS. 2 and 3, the rows are arranged longitudinally with five emboss patterns in each row having four rows per cylinder in FIG. 2 and five rows in FIG. 3.

Figure 12:
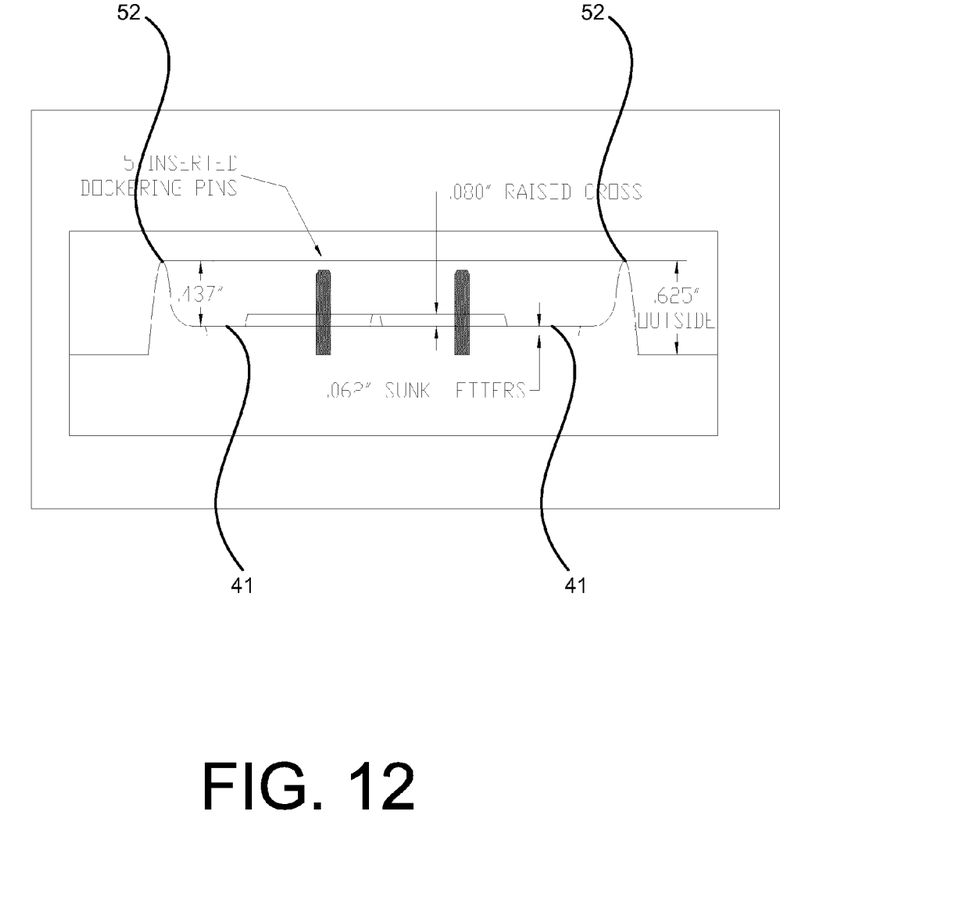
FIG. 12 shows a cutaway view of raised emboss elements and recessed areas on the embossed pattern surface according to an embodiment of the present invention.

The surface inside each molded frame may be elevated relative to surfaces on the cylinder member outside the molded frame by between about 0.15 inches to about 0.25 inches. The borders around each individual emboss pattern are raised relative to the engraved surface by a height ranging from about 0.4 inches to about 0.45 inches. The imprinting plates include five pins which extend through the surface of the respective plates and pierce five spaced holes in the dough. The pins also protrude from about 0.38 inches to about 0.43 inches above the engraved surface. The pins preferably are raised to a level below the borders as illustrated in FIG. 12.

As the cylinder member rotates across the dough, the border lips of the emboss patterns are pressed against the dough sheet with sufficient force to separate out individual loaves from the dough, while the emboss pattern in each frame imprints the corresponding loaf and the pins of each emboss pattern pierce the loaf in their designated spots.

FIGS. 1-13 illustrate the various components and embodiments of the invention. FIGS. 1-9 generally relate to imprint plates used for imprinting the Korban image on the dough, while FIGS. 10-13 generally relate to the embodiment of the emboss pattern engraved directly onto the surface encircled by the molded frame.

Figure 1:
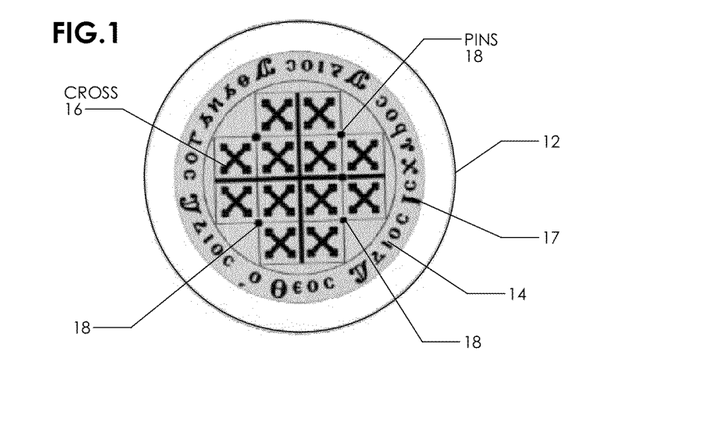
FIG. 1 is a view of an individual imprinting plate for forming a Korban loaf from a sheet of dough in accordance with an embodiment of the present invention.

FIG. 1 shows the circular imprinting plate 12 for use in forming a Korban loaf 15 to be used at the Coptic communion meal. Symbols and characters 14 are engraved to form the words Holy or "Agios" three times adjacent the periphery of the round Korban loaf 15. It will be readily appreciated that the raised characters appearing on the Korban constitute the mirror image of the emboss pattern on the plate 12. A large cross formed in the center of the plate represents Jesus Christ. Also, the central part of the imprinting plate 12 is embossed to imprint twelve crosses, generally labeled 16, on the loaf. These are in reference to the twelve disciples. Also in the center of the plate, five pins generally labeled 18 (also see FIGS. 4 and 8) extend from the surface of the plate 12 to pierce the loaf and are in reference to the five wounds suffered by Jesus Christ on the cross. The Korban loaf is circular in shape of the sun and refers to Jesus Christ. Thus, each part of the Korban loaf is formed to have religious connotation.

FIG. 2 depicts a flat sheet of dough 19 on which the Korban loaves 15 are formed mounted on a table or conveyer belt, as will be further explained.

FIG. 3 shows a preferred embodiment of the apparatus configured for concurrently cutting, imprinting and piercing of a sheet of dough 20 comprising a cylinder 29 mounted on an axle 26. A plurality of emboss patterns frames 22 mounted in spaced, longitudinally extending rows, generally labeled 23 are mounted on the periphery of the cylindrically shaped member 20 for forming the Korban loaves. In the embodiment shown, five molded frames 22 are mounted on each of the rows, and five rows are mounted on the periphery of cylinder member 20. Thus, a total of twenty five molded frames 22 are depicted in FIG. 3. The molded frames 22 in the rows are slightly offset or interleaved, as depicted in FIG. 3 in order maximize the use of the dough, i.e., to minimize waste. The edges of the border 36 that encircle frames 22 are sufficiently sharp to sever the dough 19. The dough 19 is severed, as depicted in FIG. 2 to cut and form individual circular loaves on the sheet of dough. In the embodiment of FIG. 3, the axle extends outwardly from the ends of the cylinder 29 and forms a handle thus enabling an operator to position and move/roll the cylinder member 20 over a sheet of dough to form the Korban loaves.

Figure 4:
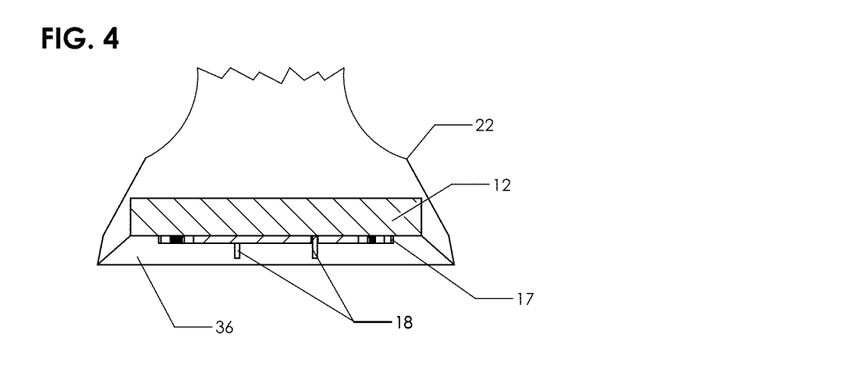
FIG. 4 is cross sectional view of the imprinting plates mounted inside the frames of the rotary cylinder member.
Figure 8:
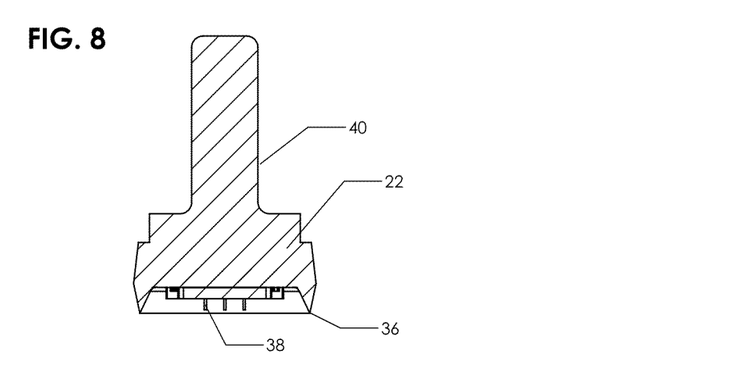
FIG. 8 is a cross sectional view embodiment of FIG. 7 to show the relation of the imprinting plate, the piercing pins, and the cutting edge of the frames.
Figure 9:
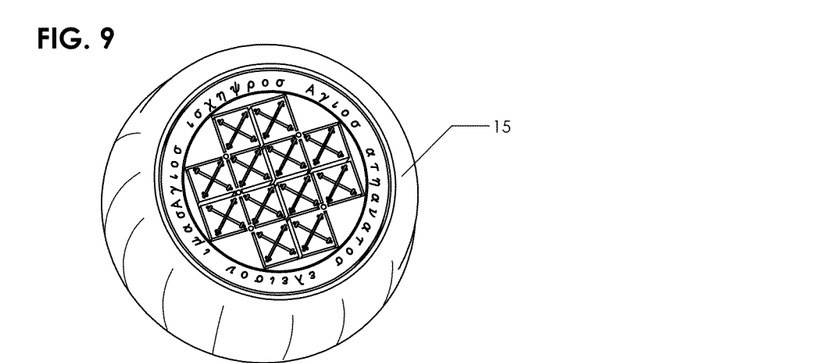
FIG. 9 is a view of the Korban loaf ready to be offered to the congregation.

In the embodiment of FIG. 3, five rows of molded frames 22 encircled by borders 36 are mounted to rotate on axle 26. The molded frames 22 are thus rotated by cylinder 29 and axle 26 to provide a rotating sequence for the cylinder member. As the axle 26 is rotated and the molded frames 22 on cylinder 29 come in contact with the dough, the border 36 of the molded frames 22 will cut successive circles of dough 15 adjacent one another. The dough between the loaves 15 is then removed from the sheet 19 and the individual loaves 15 are baked to thus forming the Korban loaves. As stated above, the cylinder member 20 comprises multiple emboss patterns. It should be appreciated that more or fewer frames can be mounted on the axle dependent on the requirement of the number of loaves to be made, and the diameter and length of the cylinder member 20. Note that FIG. 3 depicts one embodiment of the cylinder member 20 comprising twenty five molded frames 22. In FIG. 3, the axle 26 may comprise a handle which may be operated manually. Briefly refer to FIG. 5 that depicts a power driven cylinder member 25. The cylinder member molded frames 22 are identical for both the manually driven cylinder member and the power driven cylinder member. In the preferred embodiment, the frames 22 are identical and each molded frame 22 functions separately to form an identical loaf 15. A description of one molded frame 22 thus applies to all the other frames 22. Referring now more particularly to FIGS. 1, 4 and 8, the circular Korban imprinting plate 12 is shown mounted and positioned inside the molded frame 22 of the cylindrical member 20. Basically, the imprinting plate 12 is mounted inside frame 22 in a relatively recessed position to enable the cut to be made on the sheet of dough 19 by the sharp edges of the frames and yet permit the forming of the symbols and characters on the top surface of the dough. The dough 19 is approximately one-half inch in thickness. As stated above, the dough is made of unsalted white wheat flour, leavening and water only and rolled into a flat sheet 19.

FIG. 4 is a cross section view of a molded frame 22 such as shown in FIG. 3; the molded frame in FIG. 4 is oriented vertically to more clearly show the structure, and the extension of the piercing pins. The border of the molded frame 22 extends downwardly and has a sharp edge 36 for severing the sheet of dough 19. The Korban forming plate 12 is mounted in the center of the frame 22 by suitable means such as screws at a position which accommodates the thickness of the sheet of dough. In one embodiment, the plate is mounted one-half inch from the cutting edge of the molded frame 22, since the sheet of dough is rolled to be approximately one-half inch in thickness. As described above, the Korban imprinting plate 12 is embossed with symbols and characters on its surface 17 that impinges on the dough 19 to imprint the symbols and characters on the surface of the dough while not damaging the surface of the dough. Pins 18 on imprinting plate 12 extend outwardly to pierce the dough to provide the symbolism described above. The interior edges of the molded frame 22 are angled slightly outwardly to enable clean withdrawal of the molded frame 22 from the cut dough piece as the molded frame 22 is moved upwardly after cutting the dough.

Figure 5:
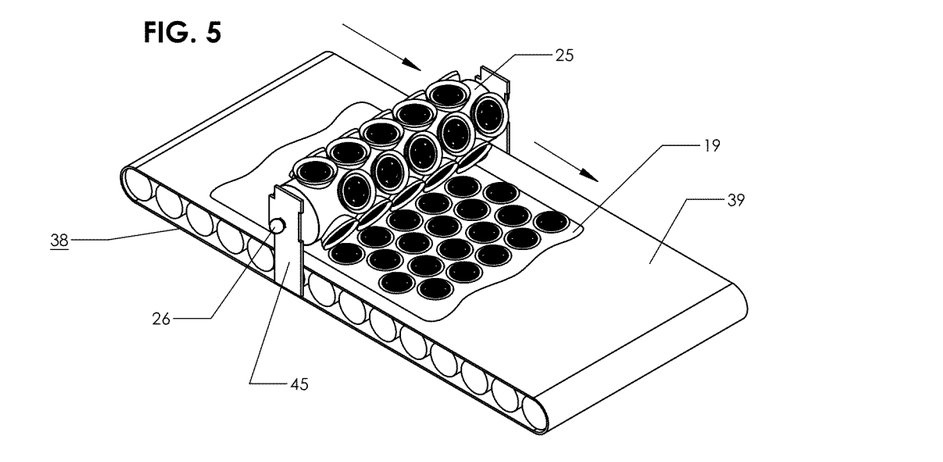
FIG. 5 is a perspective view of a power driven rotary cylinder member for cutting, imprinting and piercing of dough in accordance with the invention.

FIG. 5 depicts the cylinder member 25 including multiple molded frames 22 mounted on an axle 26 (not shown in FIG. 5, but similar to axle 26 of FIG. 3 of cylinder 29) wherein the axle 26 and therefore cylinder member 25 is driven by an electric motor of any suitable known design, not shown. Note that cylinder members 20 and 25 and the frames 22 thereof are identical except for the means of driving the units. FIG. 5 show the cutter 25 mounted on a belt conveyer system 38. The cylinder member 25 mounted over a conveyer belt 39 that is carrying a sheet of dough 19.

Figure 6:
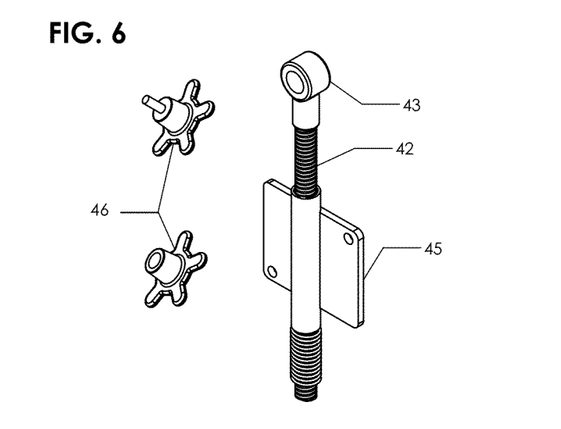
FIG. 6 is an isometric exploded view of the brackets to mount the rotary cylinder in position as depicted in FIG. 5.

FIG. 6 depicts convenient brackets for mounting the cutter 25 on the conveyer system 38. A threaded adjustable rod 42 includes a socket 43 for receiving axle 26 of cylinder member 25. Plate 45 and nuts 46 conveniently and removably affix the rod 42 to the conveyor system 38. There are two sets of brackets, one for each side of the conveyor. Two mechanisms may be used for driving the cylinder member. The first mechanism adjusts the cylinder member to engage the conveyer belt and rotate as the belt moves; the second mechanism connects the cylinder member directly to the conveyer motor through a timing belt.

As the molded frame 22 is moved over the dough, multiple dough pieces (Korbans) will be cut at a time. While in the embodiment shown, five rows of frames and five columns of frames are shown, it is envisioned that from one to four columns of frames and one to five rows of molded frames may be mounted on the cylinder member, dependent on the number of loaves required. Importantly and as depicted in FIGS. 2, 3 and 5, multiple loaves are cut, imprinted and pierced during on full pass (rotation) of the molded frames 22 of cylinder member 20. Further, the multiple operation of imprinting, piercing and cutting of each Korban loaf is done concurrently. A multiple item rotary cutter as in claim 1 wherein said imprinting plates are formed of metal such as stainless steel or aluminum and said plates are heated when applied to cutting the dough whereby said heated metal gelatinize the starches in said dough thereby making the symbols and character more permanent and enhances their visibility.

The imprinting plate 12 may be made of stainless steel, aluminum, plastic or wood. When made of stainless steel and aluminum the imprinting plate 12 can be heated, so that as the surface of the plate impinges on the dough, it gelatinize the starch and makes the symbols and the characters more obvious and permanent. The symbols and characters will not fade during the baking process. In addition, the molded frames 22 can be coated by non-stick material to ease the release of the dough. Further, the position of the imprinting plate 12 may be moved within the sides of molded frame 22 to be adapted for use with other types and thicknesses of dough.

Figure 7:
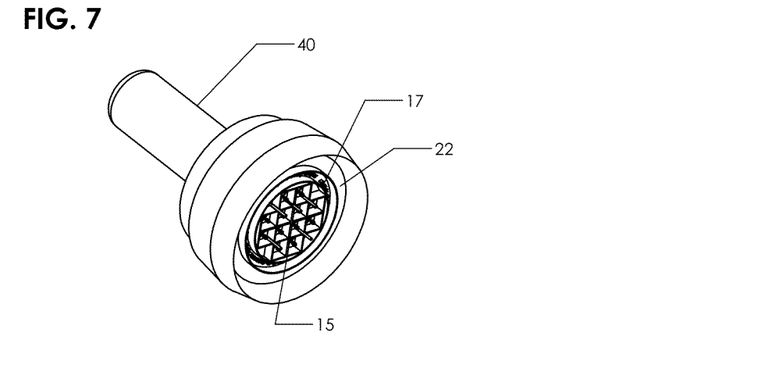
FIG. 7 shows an imprinting plate mounted on a handle that may be used to cut, imprint and pierce Korban loaves individually.

FIGS. 7 and 8 show a hand held tool 40 for piercing, imprinting and cutting Korban loaves when the number of loaves required is not large. The molded frame 22 shape is similar to that used on the cylinder member but attached to a handle. Note again, that exactly five piercing pins 38 are mounted in each molded frame 22 as depicted in FIGS. 1, 4 and 8 respectively show only two and three pins because of the section angle being viewed. While the invention has been particularly shown and described with reference to preferred embodiments thereof, it will be understood by those skilled in the art that various changes in form and details may be made therein without departing from the spirit and scope of the invention. This embodiment is presented for illustration purposes.

In FIG. 10, the molded frames 55 containing the emboss patterns are shown in a front view arranged in rows that are engraved axially onto the cylinder member (shown in broken lines).

Figure 11:
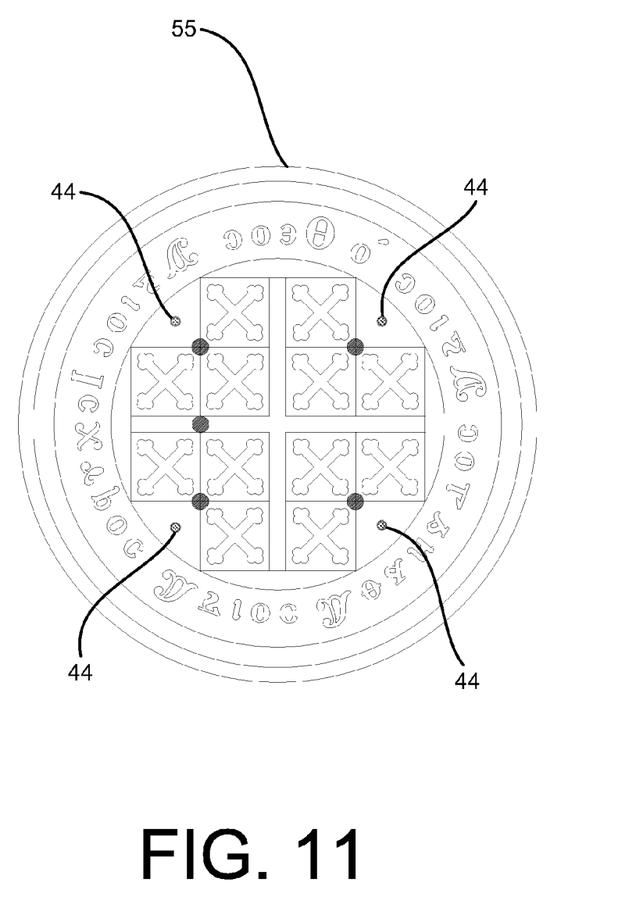
FIG. 11 is a view of an individual emboss pattern engraved onto the surface of the cylinder member surface according to an embodiment of the present invention.

FIG. 11 shows a single molded frame 55 containing four holes 44 included in the emboss pattern. The holes 44 are used to vent out that may build up in the process of imprinting the dough. It is noted that the Coptic letters and symbols are arranged in a circle at the perimeter of the emboss pattern while the cross designs are in situated in the center. The letters and symbols are generally sunken below the surface of the emboss pattern and produce the desired imprints on the Korban loaf in the form of raised symbols and letters. The cross designs may be made of a more complex combination of protrusions and recessed areas that produce the opposite image forms on the Korban.

The sectioned side view of FIG. 12 shows the emboss pattern inside borders 52 having a combination of raised areas and sunken areas in relation to the emboss pattern surface 41 highlighting the pins and dimensions of the molded frame components.

Figure 13:
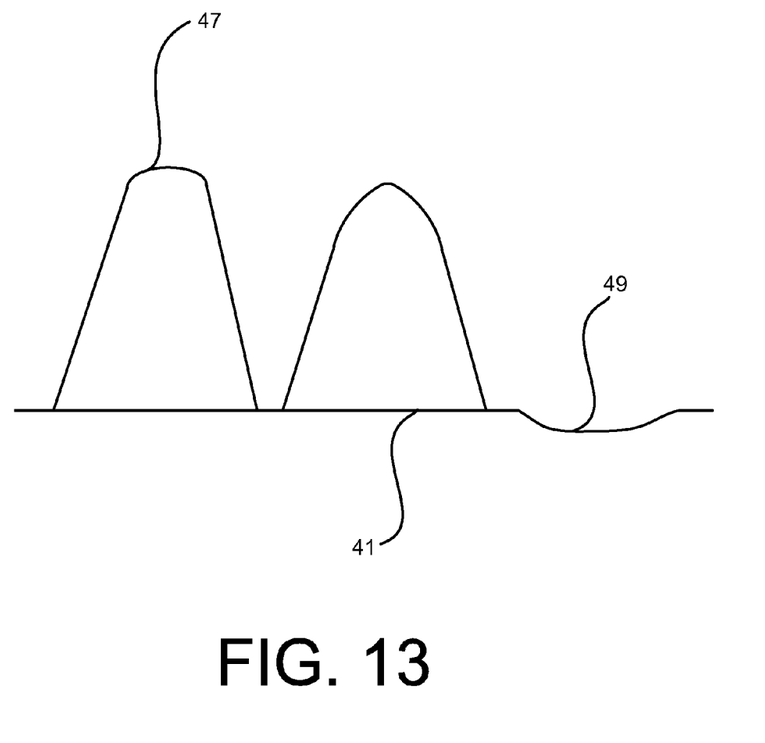
FIG. 13 is a depiction of shaped emboss-pattern components according to an embodiment of the present invention.

FIG. 13 shows raised emboss elements 47 and sunken areas 49 areas in relation to the emboss pattern surface 41. The emboss pattern elements 47 are preferably shaped in a way that the dough flows smoothly around the elements to avoid the formation of ridges and rough areas on the Korban loaf. As can be seen, the sides of the elements are angled, also referred to in the art as "radiused" such that the top is narrower than the base and the ends are rounded. Likewise, the sunken areas do not contain any sharp angles.

The embodiments presented herewith relate to a rotating cylinder configured for cutting out loaves from a sheet of dough while simultaneously imprinting and piercing each loaf. It should be understood that processes wherein these actions are accomplished manually are not precluded by the present invention. For example, an individual loaf may be processed by a hand held device such as one shown in FIG. 7, or a vertical press containing multiple frames molded onto a plate configured for being pressed onto a sheet of dough so to produce multiple imprinted and pierced loaves.

It should be understood, of course, that the foregoing relates to exemplary embodiments of the invention and that modifications may be made without departing from the spirit and scope of the invention.

I claim:

1. An apparatus configured for manually and concurrently cutting, imprinting and piercing of a sheet of dough to produce imprinted loaves, said dough consisting of flour, water and yeast, said apparatus comprising:
    a cylindrical member mounted on an axle, said cylindrical member having a length;
    a plurality of embossing patterns engraved onto an inner surface disposed on the cylindrical member, each of said embossing patterns placed inside a frame, each of said embossing patterns encircled by an outwardly extending border, said border constituting a cutting edge protruding above the inner surface, said embossing patterns containing a plurality of shaped projections that protrude outwardly and are elevated above the inner surface on which the embossing patterns are placed, said embossing patterns also containing recessed areas below the inner surface on which said embossing patterns are placed;
    each of said embossing patterns having a circular border that protrudes, relative to the engraved surface by a height ranging from about 0.4 inches to about 0.45 inches, each of said embossing patterns are elevated relative to outer surfaces on the cylinder member outside the respective frame by between about 0.15 inches to about 0.25 inches and contains a plurality of areas that are recessed from the inner surface of each embossing pattern, said recessed areas being arranged in a circle on a periphery of each embossing pattern, said recessed areas forming symbols representing Coptic script encircling a plurality of cross patterns, said recessed areas being configured to form corresponding raised areas on a respective loaf in a course of imprinting the loaf;
    said circular borders arranged in rows, said rows are offset and interleaved;
    a plurality of outwardly projecting pins contained within said embossing patterns, said pins being affixed on said inner surface, and protrude from about 0.38 inches to about 0.43 inches above said engraved surface; and
    wherein downward pressure applied manually to said axle of said cylindrical member is configured to cause said cylindrical member to engage a sheet of dough in a manner such that simultaneously a cutting edge slices out the respective loaf from the dough, sheet the respective embossing pattern encircled by a cutting edge imprints the respective loaf and the outwardly projecting pins contained within the respective embossing pattern pierce a respective loaf.

2. The apparatus of claim 1 wherein a plurality of frames are arranged in one or more rows extending across the length of the cylinder member, wherein the frames in each row are arranged axially around the cylinder member and wherein the embossing patterns in each row are staggered relative to an adjacent row.

3. The apparatus of claim 1 wherein each embossing pattern contains a plurality of areas that are recessed from the inner surface of each embossing pattern, said recessed areas being arranged in a circle on the periphery of each embossing pattern, said areas forming symbols representing Coptic script, said recessed areas being configured to form corresponding raised areas on the respective loaf in the course of imprinting the loaf.

4. The apparatus of claim 1 wherein each embossing pattern contains a plurality of areas that are configured to imprint a plurality of cross images onto the respective loaf, wherein a portion of the recessed areas configured to imprint images of crosses onto the respective loaf are recessed from the surface, and a portion of the recessed areas configured to imprint images of crosses onto the respective loaf are raised above said inner surface.

5. The apparatus of claim 2 wherein the embossing patterns are arranged in at least one row and each row contains at least two of the embossing patterns.

6. The apparatus of claim 5 wherein the embossing patterns are arranged in at least three rows wherein each row contains at least four of the embossing patterns.

7. The apparatus of claim 1, further comprising at least one vent for allowing air pressure build-up to escape, said vent constituting an opening in the embossing pattern surface permeating through the cylinder member.

8. The apparatus of claim 1, further comprising heating means adapted to heat a surface of the embossing pattern to a temperature ranging from about 90 degrees F. to about 180 degrees F.

9. The apparatus of claim 1 wherein the respective embossing pattern is engraved onto the surface of a plate mounted to the cylinder member.

10. The apparatus of claim 1 wherein the respective embossing pattern is engraved onto the surface of the cylinder member.

11. The apparatus of claim 1 wherein the respective embossing pattern is coated with a non-stick material to prevent dough picking by the emboss pattern.

12. The apparatus of claim 1 wherein the embossing patterns are identical.

13. The apparatus of claim 1 wherein said cylindrical member is mounted onto a moving, rotating and loading mechanism over a movable conveyer belt adapted for conveying a sheet of dough.

14. The apparatus of claim 1, wherein the respective frame is molded onto the cylinder member.

15. An apparatus configured for manually and concurrently cutting, imprinting and piercing of a sheet of dough to produce imprinted loaves, said dough consisting of flour, water and yeast, said apparatus comprising:

a cylindrical member mounted on an axle, said cylindrical member having a length;

a plurality of embossing patterns engraved onto an surface disposed on the cylindrical member, each of said embossing patterns placed inside a molded frame, each of said embossing patterns encircled by an outwardly extending border, said border constituting a cutting edge protruding above the inner surface, said embossing patterns containing a plurality of shaped projections that protrude outwardly and are elevated above the surface on which the embossing patterns are placed, said embossing patterns also containing recessed areas below the inner surface on which said embossing patterns are placed;

the plurality of areas are recessed from a surface of each embossing pattern, said recessed areas being arranged in a circle on a the periphery of each embossing pattern, said recessed areas forming symbols representing Coptic script encircling a plurality of cross patterns, said recessed areas being configured to form corresponding raised areas on a respective loaf in a course of imprinting the loaf;

a plurality of outwardly projecting pins contained within said embossing patterns, said pins being affixed on said surface, wherein the projecting pins protrude from about 0.38 inches to about 0.43 inches above the inner surface such that the projected pins are raised to a level below a height of the border encircling the respective embossing pattern; and wherein downward pressure applied manually to said axle of said cylindrical member is configured to cause said cylindrical member to engage a sheet of dough in a manner such that simultaneously a cutting edge slices out the respective loaf from the dough, an embossing pattern encircled by a cutting edge imprints the respective loaf and the projecting pins contained within an embossing pattern pierce the respective loaf, wherein the inner surface inside the respective molded frame is elevated relative to outer surfaces on the cylinder member outside the molded frame by between 0.15 inches to about 0.25 inches.

* * * * *